United States Patent [19]

Harris

[11] Patent Number: 4,870,719
[45] Date of Patent: Oct. 3, 1989

[54] OYSTER SHELL SEPARATOR

[76] Inventor: James Harris, 3312 Livonia Ave., Los Angeles, Calif. 90034

[21] Appl. No.: 261,090

[22] Filed: Oct. 24, 1988

[51] Int. Cl.⁴ .............................................. A22C 29/04
[52] U.S. Cl. .......................................... 17/74; 17/76; 17/48
[58] Field of Search ................... 17/74, 76, 71, 75, 48

[56] References Cited

U.S. PATENT DOCUMENTS

| | | | |
|---|---|---|---|
| 2,391,739 | 12/1945 | Ragupos | 17/74 |
| 4,348,788 | 9/1982 | Jurcak | 17/76 |
| 4,796,333 | 1/1989 | Stinson, Jr. et al. | 17/76 |

FOREIGN PATENT DOCUMENTS 1464856  1/1967  France .................................... 17/74

Primary Examiner—Willis Little
Attorney, Agent, or Firm—I. Michael Bak-Boychuk

[57] ABSTRACT

An oyster shell separator deploys a conical, helically ridged, powered point driven in rotation by an electrical motor within a wedge shaped housing. The conical point draws the shells onto a flanged collar selected in dimension to fully separate the shells. From the collar the shell halves are passed along the sides of the housing for collection and sorting.

4 Claims, 3 Drawing Sheets

OYSTER SHELL SEPARATOR

BACKGROUND OF THE INVENTION

1. Field of the Invention

The present invention relates to clam or oyster shell separation devices, and more particularly, to a powered device for separating shells.

2. Description of the Prior Art

Separation of the shells of an oyster or clam typically entails large forces by which the joining structure is forcibly severed or parted to release the shell halves. In accordance therewith various sharp parting devices have been devised which are manually inserted between the shell halves and are thereafter manipulated to cut and separate the joining muscle.

Beyond the foregoing manually operated devices various powered devices have been devised which in one manner or another assist in the separation of shell halves. Examples of such earlier teachings are found in U.S. Pat. Nos. 2,415,989 and 2,391,739 and the British Patent No. 630,038 to Layda Fradna. Each of the foregoing, while suitable for their purposes, either reciprocate a knife blade or combine reciprocal and rotary motion with a sharp edge presented against the clam shells. The operator engaged in this effort is thus exposed to some potential of injury.

While some risk of personal injury is always present recent legislation has imposed various safety demands for the protection of the employee. In light of these statutory demands extensive modification of the work place is now required and alternatives to these earlier techniques are therefore extensively sought. It is one such alternative that is disclosed herein.

SUMMARY OF THE INVENTION

Accordingly, it is the general purpose and object of the present invention to provide a powered oyster shell separator rendered effective by the hard structures of the shells.

Other objects of the invention are to provide a powered oyster shell separator characterised by spiral opening cone on the front of a tape red housing.

Yet further objects of the invention are to provide a simple and convenient power tool conformed to separate oyster shells.

Briefly, thee and other objects are accomplished within the present invention by providing a generally V-shaped housing in which a rotary power source is enclosed. The output shaft of this rotary power source is then directed towards and through the apex of the housing to emerge at the exterior thereof in the form of a conical, spiral, point insertable at the separation between the shell halves. To effect this insertion the forward edge of the spiral point is flattened and thence faired to a twist which continues in a spiral over the conical surface. Thus once inserted into the part between the shell halves the twist then draws the oyster onto the cone, separating the shells. As the shells are thus separated the manual stroke then progresses along the wedges walls of the housing.

In consequence high repetition rates are achieved with the power source selectively rendered operative by a foot switch or by way of continuous pwoered operation. Containers may be positioned on the sides of the housing into which the shell halves are colelcted for sorting, cleaning and dispensing.

DESCRIPTION OF THE PREFERRED EMBODIMENT

Figure 1:
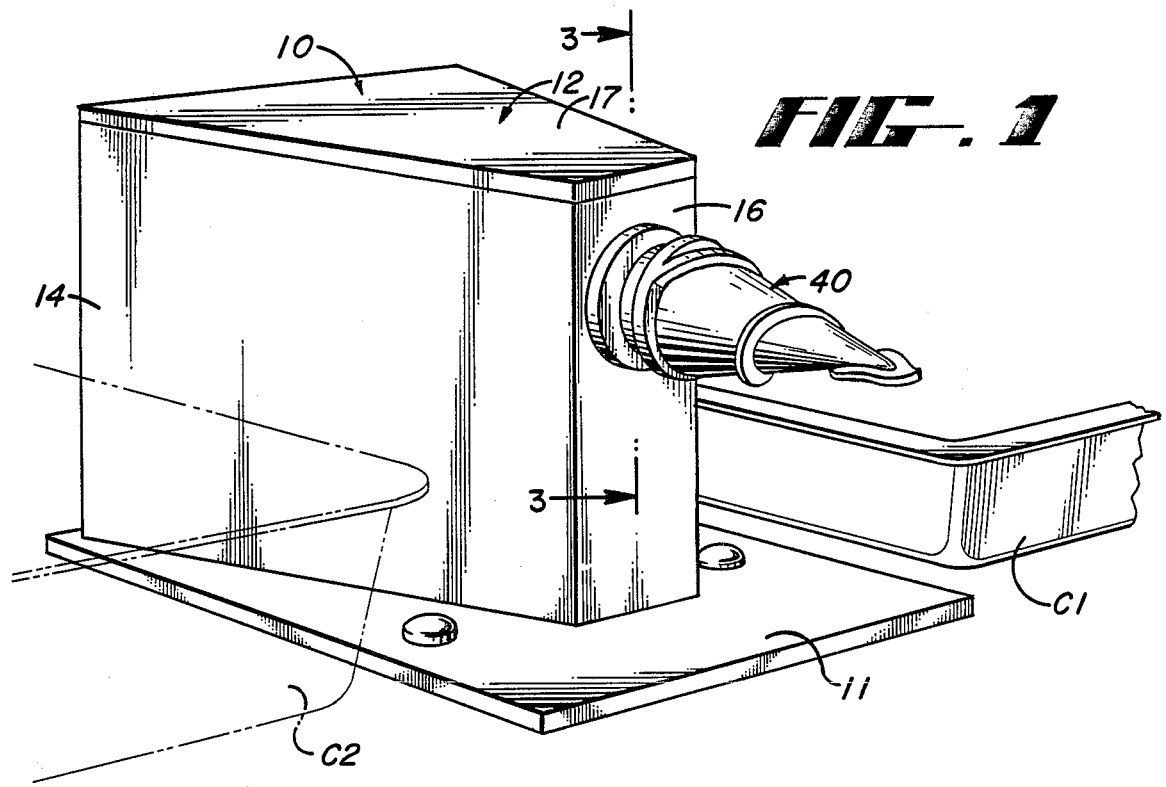
FIG. 1 is a perspective illustration of the inventive assembly in its operative state.
Figure 2:
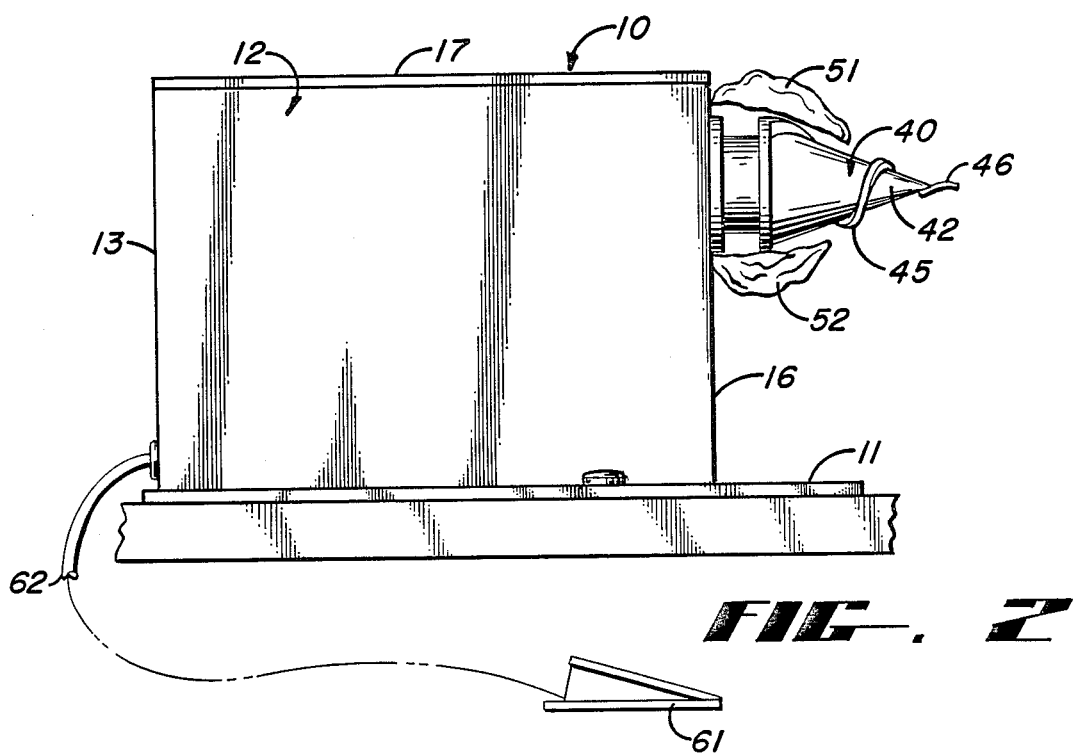
FIG. 2 is a side view of the assembly shown in FIG. 1.
Figure 3:
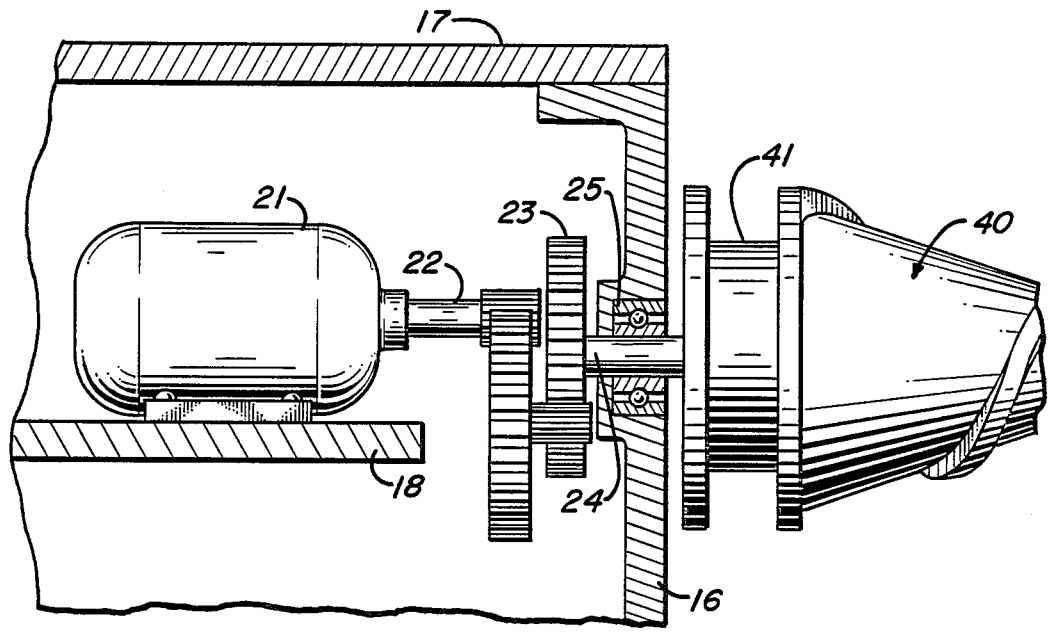
FIG. 3 is a sectional side view taken along line 3—3 of FIG. 1.
Figure 4:
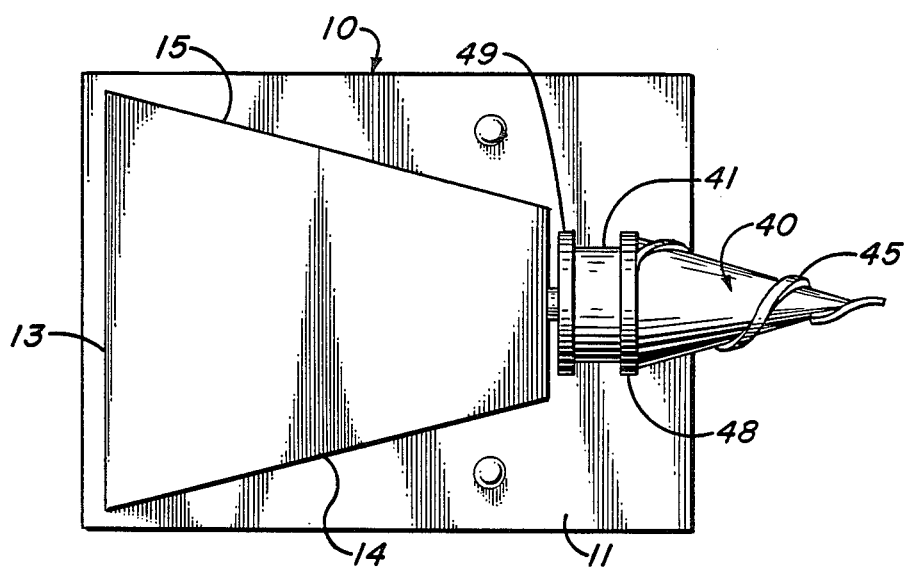
FIG. 4 is a top view of the assembly shown in FIG. 1.
Figure 5:
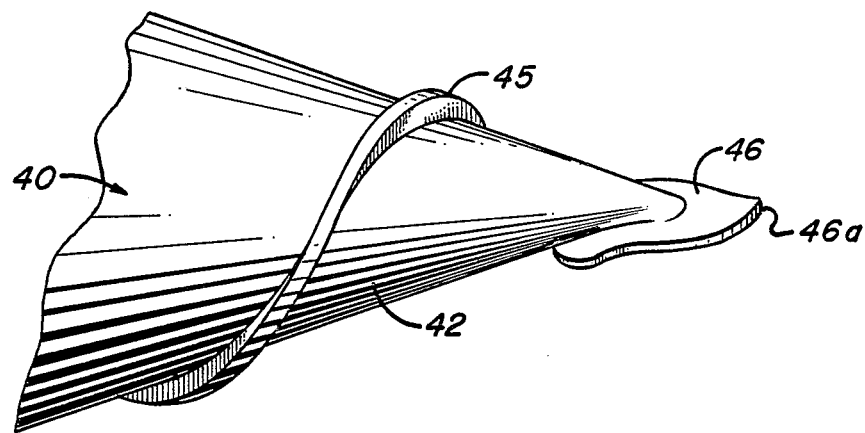
FIG. 5 is a perspective detail of a spiral point useful with the present invention.

As shown in FIGS. 1-5 the inventive assembly, generally designated by the numeral 10, comprises a substantially rectangular base plate 11 onto which a vertical housing 12 is fixed. Housing 12 is generally triangular or wedge shaped in configuration, defined by a rear surface 13, two lateral surfaces 14 and 15 aligned at an angle towards each other from the rear surface 13 towards a narrow front strip 16. In this form the housing 12 forms a generally wedge-shaped structure terminating in a narrow vertical face strip 16. To complete the enclosure housing 12 may further include a removable top panel 17 through which access is made into its interior.

On the interior housing 12 is provided with a horizontal mounting shelf 18 onto which an electrical motor 21 is fixed. Motor 21 extends its output shaft 22 into a gear reducer 23 which then extends its output shaft 24 through a thrust bearing 25 in the front face strip 16. On the exterior shaft 24 engages a collar 41 at the base of a conical tool 40. Tool 40 is generally shaped as a conical mandrel 42 having formed over its exterior a tapered spiral blade 45 terminating in a twisted end flat 46 at the tip of mandrel 42. The forward edge of flat 46 is angled to a point 46a for registration at the parting plane between the shell halves 51 and 52. Once thus inserted the twist of flat 46 draws the shell onto the mandrel which thereafter spreads the shell halves as they are further drawn onto the mandrel by the spiral blade 45. In the course of this progression the shell is held manually against turning.

Once on the mandrel the shell halves 51 and 52 are drawn to full separation by the mandrel base diameter and thereafter advanced onto a base groove defined by the collar 41 bounded by two coaxial base flanges 48 and 49 separated from each other by the nominal dimension of a shell. Thus the edible matter within the shell halves 48 and 49 disposes between the flanges 49 and 51 while the operator then performs such further separation as may still remain.

Figure 6:
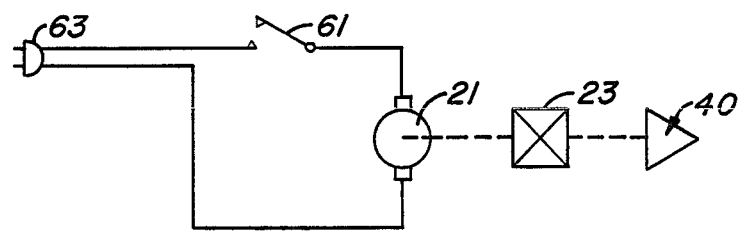
FIG. 6 is a diagram of the power source in accordance with the present invention.

To effect this manual separation the electrical power to motor 21 may be selectively applied by way of a push-to-close foot swtich 61 at the end of a switch harness 62 which, as illustrated in FIG. 6, completes the circuit with a wall plug 63. Thus, the operator is free to manipulate the shell halves during the powered separation, depositing same in containers C1 and C2 placed adjacent the sides of housing 12.

One should note that the initial registration is first effected at the shell parting plane by point 46a. Once sufficient shell matter is thus ground away the projecting surface of flat 46 will pass into the shell muscle. The hard shell structure then grasps edge 45 to be drawn onto the mandrel.

Figure 7:
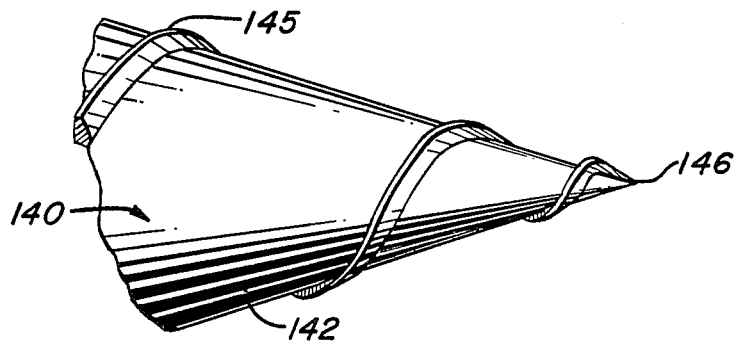
FIG. 7 is a further alternative perspective detail of a point useful with the present invention.

In an alternative, shown in FIG. 7, a point assembly generally at 140, may be used in substitution for assembly 40. Those skilled in the art will appreciate that once thus substituted assembly 140 cooperates in like manner with the remaining structure set out and for the description thereof reference should be had to the prior paragraphs of these teachings. In this form assembly 140 includes a conical body 142 onto which a spiral edge 145 is formed fairing to a point 146 at the cone apex. It is this point that is then useful for insertion between the shell halves.

Obviously many modifications and changes may be made to the foregoing description without departing from the spirit of the invention. It is therefore intended that the scope of the invention be determined solely on the claims appended hereto.

What is claimed is:

1. A powered shell separator comprising:
a generally wedge shaped hollow housing defined by a generally vertical, flat, rear wall joined to two lateral walls aligned towards each other in a wedge alignment and a vertical strip joining said lateral walls at the edges thereof opposite said rear wall;
an electric motor mounted within said housing;
a reduction gear assembly mounted in said housing and conformed for engagement with said motor, said gear assembly including an output shaft extending through said vertical strip to the exterior of said housing; and
a conical mandrel fixed to said output shaft on the exterior of said housing for rotary advancement thereby, said mandrel including a flat surface extending from the apex thereof and faired as a spiral projection along said mandrel.

2. Apparatus according to claim 1 further comprising:
a foot switch connected to said electrical motor for selective excitation thereof.

3. Apparatus according to claim 2 wherein:
said mandrel is defined by a base proximate said strip, said base including a first and second coaxial circular flange separated by a collar.

4. A powered shell separator comprising:
a generally wedge shaped hollow housingn defined by a generally vertical, flat, rear wall joined to two lateral walls aligned towards each other in a wedge alignment and a vertical strip joining said lateral walls at the edges thereof opposite said rear wall;
an electric motor mounted within said housing;
a reduction gear assembly mounted in said housing and conformed for engagement with said motor, said gear assembly including an output shaft extending through said vertical strip to the exterior of said housing;
a conical mandrel fixed to said output shaft on the exterior of said housing for rotary advancement thereby, said mandrel including a point extending from the apex thereof faired into a spiral, projecting edge along said mandrel;
a foot switch connected to said electrical motor for selective excitation thereof; and
said mandrel is defined by a base proximate said strip, said base including a first and second coaxial circular flange separated by a collar.

* * * * *